United States Patent
Su (10) Patent No.: US 11,109,226 B2
(45) Date of Patent: Aug. 31, 2021

(54) INFORMATION PROCESS METHOD, COMPUTER READABLE STORAGE MEDIUM AND COMPUTER DEVICE

(71) Applicant: GUANGDONG OPPO MOBILE TELECOMMUNICATIONS CORP., LTD., Guangdong (CN)

(72) Inventor: Zhiwei Su, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/651,188

(22) PCT Filed: Aug. 20, 2018

(86) PCT No.: PCT/CN2018/101345
§ 371 (c)(1),
(2) Date: Mar. 26, 2020

(87) PCT Pub. No.: WO2019/062379
PCT Pub. Date: Apr. 4, 2019

(65) Prior Publication Data
US 2020/0275262 A1    Aug. 27, 2020

(30) Foreign Application Priority Data

Sep. 30, 2017 (CN) .......................... 201710939798.X (51) Int. Cl.
*H04W 8/26* (2009.01)
*H04W 4/60* (2018.01)
(Continued)

(52) U.S. Cl.
CPC .............. *H04W 8/26* (2013.01); *H04W 4/60* (2018.02); *H04W 8/183* (2013.01); *H04W 8/24* (2013.01)

(58) Field of Classification Search
CPC ......... H04W 8/26; H04W 8/183; H04W 8/24; H04W 4/60
See application file for complete search history.

(56) References Cited

U.S. PATENT DOCUMENTS

2015/0099562 A1    4/2015 Xiong
2016/0050556 A1    2/2016 Zhao et al.
(Continued)

FOREIGN PATENT DOCUMENTS

CN      1856138 A     11/2006
CN    104883658 A      9/2015
(Continued)

OTHER PUBLICATIONS

Extended European Search Report for EP application 18860153.8 dated Oct. 29, 2020.
(Continued)

*Primary Examiner* — Wayne H Cai
(74) *Attorney, Agent, or Firm* — Young Basile Hanlon & MacFarlane, P.C.

(57) ABSTRACT

The present application relates to an information process method, a computer readable storage medium and a computer device. The method includes: acquiring a first quantity and a conflict probability, the first quantity being the quantity of mobile terminals for which virtual SIM card data is pre-configured, the conflict probability being the probability that multiple mobile terminals use the same virtual SIM card data for connection with a network at the same time; acquiring a first outbound proportion according historical data; and according to the first quantity, the conflict probability and the first outbound proportion, determining the quantity of the virtual SIM card data.

20 Claims, 5 Drawing Sheets

(51) Int. Cl.
H04W 8/18 (2009.01)
H04W 8/24 (2009.01)

(56) References Cited

U.S. PATENT DOCUMENTS

| | | | |
|---|---|---|---|
| 2018/0199303 A1* | 7/2018 | Vayilapelli | H04W 8/04 |
| 2019/0149979 A1* | 5/2019 | Xiong | H04W 8/183 |
| | | | 455/435.1 |
| 2019/0246265 A1* | 8/2019 | Schell | H04W 8/205 |

FOREIGN PATENT DOCUMENTS

| | | |
|---|---|---|
| CN | 104902463 A | 9/2015 |
| CN | 105554913 A | 5/2016 |
| CN | 105939514 A | 9/2016 |
| CN | 105959932 A | 9/2016 |
| CN | 106211131 A | 12/2016 |
| CN | 106304037 A | 1/2017 |
| CN | 107040912 A | 8/2017 |
| CN | 107124708 A | 9/2017 |
| CN | 107708108 A | 2/2018 |
| WO | 2014031912 A1 | 2/2014 |
| WO | 2016169311 A1 | 10/2016 |
| WO | 2017016070 A1 | 2/2017 |

OTHER PUBLICATIONS

English translation of OA for CN application 201710939798.X.
English translation of ISR for PCT application PCT/CN2018/101345.
Indian Examination Report for IN Application 202017016292 dated Jun. 2, 2021. (6 pages).

* cited by examiner

INFORMATION PROCESS METHOD, COMPUTER READABLE STORAGE MEDIUM AND COMPUTER DEVICE

CROSS-REFERENCE TO RELATED APPLICATION(S)

This application is a 371 application of International Application No. PCT/CN2018/101345, filed on Aug. 20, 2018, which claims priority to Chinese Patent Application No. 2017/10939798.X, filed on Sep. 30, 2017, the entire contents of both of which are incorporated herein by reference in their entireties.

TECHNICAL FIELD

The present disclosure relates to a field of computer technology, and more particularly, to an information process method, a computer-readable storage medium and a computer device.

BACKGROUND

With improvement of user's living standard, more and more users go abroad for travelling, learning, working or the like. Generally, when a user cannot access to a mobile network using a SIM (subscriber identity module) installed in a mobile terminal abroad, the user may choose to buy another SIM belonging to a local operator or to enable roaming service for the SIM installed in the mobile terminal to connect to the mobile network. Generally, the international roaming service for the SIM is expensive, while frequently changing of the SIM will bring inconvenience for the user.

SUMMARY

Embodiments of the present disclosure provide an information process method, a computer-readable storage medium and a computer device.

The information process method includes: obtaining a first number and a confliction probability, the first number representing a number of mobile terminals pre-configured with virtual SIM data and the confliction probability representing a probability that a plurality of mobile terminals use same virtual SIM data for connection with a network at a same time point; obtaining a first departure ratio based on historical data; determining an amount of the virtual SIM data based on the first number, the confliction probability and the first departure ratio.

The computer-readable storage medium has a computer program stored thereon. When the computer program is executed by a processor, operations of the above method are implemented.

The computer device includes a memory and a processor. The memory has computer-readable instructions stored therein. When the computer-readable instructions are executed by the processor, the processor is caused to perform operations of the above method.

BRIEF DESCRIPTION OF DRAWINGS

To illustrate the solutions according to the embodiments of the present disclosure or in the prior art more clearly, accompanying drawings needed for describing the embodiments or the prior art are briefly introduced below. Obviously, the accompanying drawings in the following description are merely some embodiments of the present disclosure, and persons of ordinary skill in the art may obtain other drawings according to the accompanying drawings without making creative efforts.

DETAILED DESCRIPTION

To make the objectives, the solutions and the advantageous of the present disclosure more clear, the present disclosure will be described in detail below with reference to accompanying drawings and embodiments. It should be understood that embodiments described herein with reference to drawings are explanatory, serve to explain the present disclosure, and are not construed to limit embodiments of the present disclosure.

Figure 1:
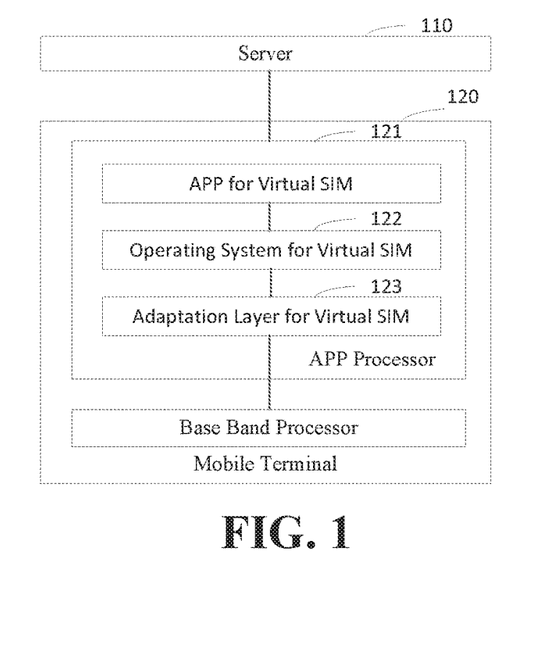
FIG. 1 is a schematic diagram of an application scenario of an information process method according to an embodiment of the present disclosure.

FIG. 1 is a schematic diagram of an application scenario of an information process method according to an embodiment of the present disclosure. As illustrated in FIG. 1, the application scenario includes a server 110 and a mobile terminal 120. The server 110 may be a server through which an operator of a virtual network provides network traffic to the mobile terminal 120, which may be a cloud server. The server 110 may provide information of a virtual SIM (Subscriber Identity Module) to the mobile terminal 120 and use the virtual SIM to realize service of network communication. The mobile terminal 120 may be provided with an APP (Application) 121 for the virtual SIM, an operation system 122 for the virtual SIM and an adaptation layer 123 for the virtual SIM. All of the APP 121, the operating system 122 and the adaptation layer 123 may be disposed in an AP (Application Processor) of the mobile terminal 120. The server 110 may send the information of the virtual SIM to the operating system 122 for the virtual SIM via the APP 121 for the virtual SIM. The operating system 122 for the virtual SIM may realize communication with control software for radio frequency communication disposed in a BP (Baseband Processor) via the adaptation layer 123 for the virtual SIM, so as to realize network communication using the virtual SIM.

The server 110 may provide relevant interfaces to the APP 121 for the virtual SIM of the mobile terminal 120 and realize the communication with the mobile terminal 120 through the interfaces. The interfaces may include an interface for user and equipment management, an interface for package and order management, an interface for encryption transmission of SIM resource, and so on. The server 110 may provide the relevant interfaces to the APP 121 for the virtual SIM in a form of an API (Application Programming Interface). The information of the virtual SIM includes but is not limited to, basic information of the virtual SIM, order information of the virtual SIM, traffic usage information of the virtual SIM, time limit information or the like.

Figure 2:
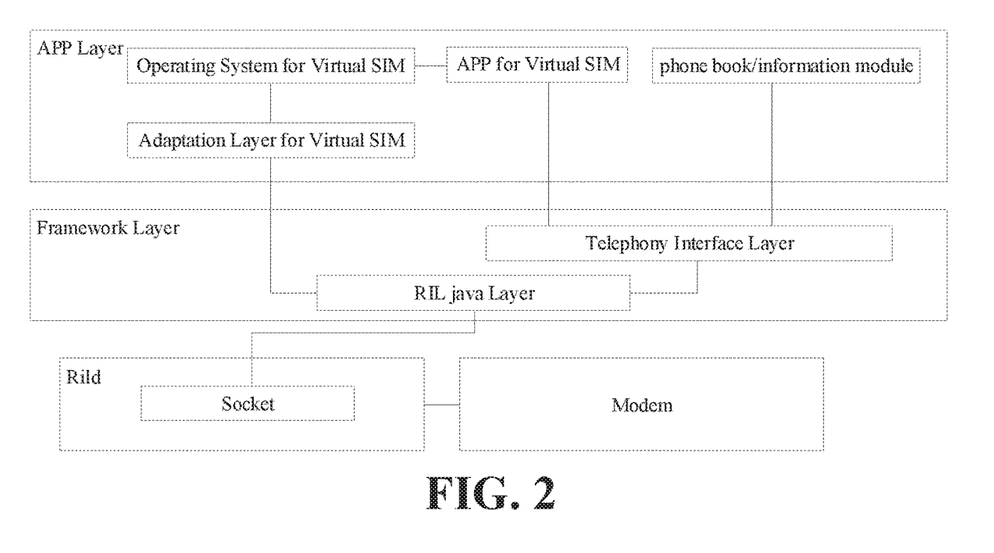
FIG. 2 is a schematic diagram of a partial architecture of a mobile terminal according to another embodiment of the present disclosure.

FIG. 2 is a schematic diagram of a partial architecture of a mobile terminal according to an embodiment of the present disclosure. The modules contained in this diagram are modules related to the virtual SIM. As illustrated in FIG. 2, an application layer of the mobile terminal may be provided with the operating system for the virtual SIM, the adaptation layer for the virtual SIM, the APP for the virtual SIM and a phone book/information module. A Framework Layer may be provided with a Telephony Interface Layer and a Radio Interface Layer, a java Layer. A Modem may be a module composed of a base band processor, a radio frequency unit and other peripheral chips, which may be a GSM/GPRS Modem. The Telephony Interface Layer is configured to provide common interfaces. The operating system for the virtual SIM performs Socket interaction with the Modem through the Telephony Interface Layer, so as to determine whether the virtual SIM exists, a position of card slot occupied by the virtual SIM or the like. The operating system for the virtual SIM performs Socket interaction with the Modem switched to a virtual SIM channel through the adaptation layer for the virtual SIM, so as to activate or disable the virtual SIM and use the virtual SIM to perform network communication or the like. It can be understood that, the structure illustrated in FIG. 2 merely indicates some modules related to the present disclosure, which should not be construed to limit the mobile terminal in which the present disclosure is applied. The mobile terminal may include more or less modules than those illustrated in the figure, or a combination of some modules, or have different arrangements of modules. For example, the Framework Layer may further be provided with a dual-card management module, which may communicate with the Telephony Interface Layer.

In one embodiment, the mobile terminal may provide a management interface for the virtual SIM to a user via the APP for the virtual SIM, generate a corresponding processing command for the virtual SIM when detecting operations directed to the management interface, and send the processing command to the operating system for the virtual SIM. The operating system for the virtual SIM may simulate a system logic of a real SIM and realize protocols for relevant specifications and a file system required by the network communication. The operating system for the virtual SIM may receive the processing command from the APP for the virtual SIM, send a message corresponding to the processing command to the Modem via the adaptation layer for the virtual SIM and receive a response message from the Modem, so as to collectively realize the network communication using the virtual SIM. The above protocols for relevant specifications may include ISO (International Organization for Standardization) 7816 and protocols about specifications such as UICC (Universal Integrated Circuit Card) and USIM (Universal Subscriber Identity Module) of 3GPP (3$^{rd}$ Generation Partnership Project).

In an embodiment, the processing command may include a command for purchasing a package of the virtual SIM, an enabling command, a disabling command, a close command or the like. A content of the network communication realized by using the virtual SIM includes but is not limited to, realizing an interaction management of the information of the virtual SIM, a dynamic update of status, statistics of traffic and rate-limitation of traffic and so on, for example realizing storage or deletion of the information of the virtual SIM, enabling or disabling of the virtual SIM or the like.

Figure 3:
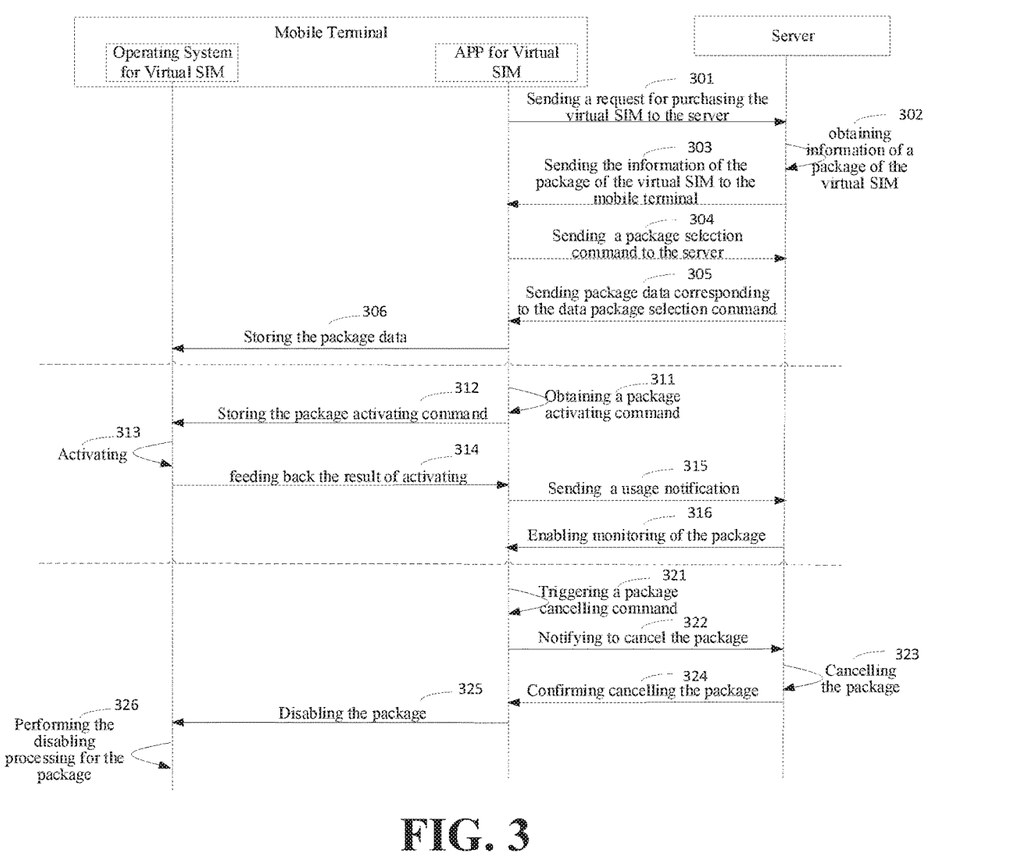
FIG. 3 is a sequence diagram of an interaction between a mobile terminal and a server according to an embodiment of the present disclosure.

In an embodiment, as illustrated in FIG. 3, a sequence diagram is provided. The sequence diagram includes an interaction between respective modules under the scenarios of purchasing the package of the virtual SIM, activating the package and disabling the package. Referring to FIG. 3, the process of purchasing the package include blocks 301-306, the process of activating the package includes blocks 311-316, and the process of disabling the package includes blocks 321-326.

By pre-configuring the virtual SIM data for the mobile terminal, the mobile terminal may use the pre-configured virtual SIM data for connection with a mobile communication network when the mobile terminal is in a network unavailable status abroad. After the mobile terminal is connected to the mobile communication network, the mobile terminal may perform a data network communication to realize operations for purchasing and activating the traffic package or the like. The above traffic refers to the number of bytes consumed by the mobile terminal for the network communication after connecting to the network.

Block 301, the mobile terminal sends a request for purchasing the virtual SIM to the server via the APP for the virtual SIM.

The mobile terminal may display an interface for purchasing the virtual SIM to the user via the APP for the virtual SIM, detect a purchasing operation directed on the interface, trigger a purchasing command based on the detected purchasing operation and send the request for purchasing the virtual SIM to the user. The interface may provide a virtual button for the purchasing operation. After a click operation directed on the virtual button is received, the purchasing command can be triggered. Alternatively, when a preset speech or movement corresponding to the purchasing command is detected, the purchasing command can be triggered. For example, when a speech "purchasing the virtual SIM" or a movement of shaking the mobile terminal upward and downward is detected, the purchasing command can be triggered.

In an embodiment, the mobile terminal may send the request for purchasing the virtual SIM to the server through a preset communication interface between the APP for the virtual SIM and the server. The request may include a user identification. The user identification is used to identify an identity of the user uniquely, which may be formed of preset digits of figures, letters or other characters.

Block 302, the server obtains information of a package of the virtual SIM according to the received request.

The server may be a server for providing network traffic to the mobile terminal. The server may obtain the information of one or more kinds of packages of the virtual SIM corresponding to the request. In an embodiment, the request may include location information of the mobile terminal. The server may obtain the information of one or more kinds of packages of the virtual SIM corresponding to the location information. The information of the package may include one or more filed information of information on total traffic, valid time and price for the traffic. The total traffic represents available total network traffic corresponding to the package, for example, 10G network traffic. The valid time represents a valid time period for the package, for example, 24 hours, 3 days or 7 days. The price represents fee required to pay for the package.

Block 303, the server sends the information of the package of the virtual SIM to the mobile terminal.

The server may send the information of the package of the virtual SIM corresponding to the request for purchasing the virtual SIM to the mobile terminal. In an embodiment, the server may send the information of several packages of the virtual SIM for selection by the user.

Block 304, the mobile terminal receives the information of the package via the APP for the virtual SIM and sends a package selection command to the server.

The mobile terminal may receive the information of the package via the APP for the virtual SIM and display the information. The mobile terminal may detect a selection operation directed on the interface for displaying the information of the package via the APP for the virtual SIM, determine a selected package based on the detected selection operation, generate the package selection command corresponding to the selected package and send the package selection command to the server. One or more packages can be selected.

Block 305, the server receives the package selection command and sends package data corresponding to the package selection command to the mobile terminal.

The server may receive the package selection command send from the mobile terminal, identifies the information of the package corresponding to the package selection command. The package selection command may include a package identification of the selected package. The server may determine the information of the package corresponding to the package identification. The package data includes basic data and traffic data of the virtual SIM. The basic data includes information on an operator of the virtual SIM, information on network accessing parameters, an identification of the virtual SIM, or other necessary data for realizing the network communication using the virtual SIM. The traffic data includes available amount and valid time for the traffic of the network communication, or the like.

Block 306, the mobile terminal receives the package data via the APP for the virtual SIM and stores the package data via the operating system for the virtual SIM.

The mobile terminal may receive the package data from the server via the APP for the virtual SIM, and forwards the package data to the operating system for the virtual SIM. The operating system for the virtual SIM may transmit the received package data to the Modem of the mobile terminal via the adaptation layer for the virtual SIM and indicates the Modem to store the package data.

Block 311, the mobile terminal obtains a package activating command via the APP for the virtual SIM.

The mobile terminal may display a package activating interface via the APP for the virtual SIM, detect an activating operation directed on the package activating interface via the APP for the virtual SIM, determine the package based on the detected activating operation, generate a package activating command for the package and send the package activating command to the server.

Block 312, the package activating command is sent to the operating system for the virtual SIM via the APP for the virtual SIM.

The APP for the virtual SIM sends the package activating command to the operating system for the virtual SIM in a communication mode preset between the APP for the virtual SIM and the operating system for the virtual SIM. The package activating command contains the package identification of the package to be activated, such that the operating system for the virtual SIM may determine the package to be activated according to the package identification and the user identification.

Block 313, the mobile terminal activates the package via the operating system for the virtual SIM.

The operating system for the virtual SIM may forward the package activating command to the Modem via the Telephony Interface Layer. The Modem extracts the package data based on the received package activating command, and activates the package data.

Block 314, a result of activating is fed back to the APP for the virtual SIM via the operating system for the virtual SIM.

The operating system for the virtual SIM may obtain the result of activating by the Modem, sends the obtained result of activating to the APP for the virtual SIM and indicates the APP for the virtual SIM to further feed the result of activating. The APP for the virtual SIM may display the result of activating on an interface of the mobile terminal for viewing by the user. The result of activating may indicate a successful activating or a failed activating.

Block 315, the mobile terminal sends a usage notification to the server via the APP for the virtual SIM.

The APP for the virtual SIM may send the result of activating to the server via the above preset interface. When the result of activating indicates a successful activating, the mobile terminal further sends the usage notification to the server via the APP for the virtual SIM. The usge notification is configured to indicate the server to start providing service for network commination using the virtual SIM.

Block 316, the server receives the usage notification and feeds a response message for enabling monitoring of the package black to the mobile terminal.

The server enables the service for using the activated package after receiving the usage notification, monitors the usage of the package with a certain frequency so as to provide the service for network communication using the package, and feeds a response message of monitoring the package to the APP for the virtual SIM, such that the user may know that the server successfully enables the service for network communication.

Block 321, the mobile terminal obtains a package disabling command via the APP for the virtual SIM.

The APP for the virtual SIM may invoke a clocker disposed inside the mobile terminal to count usage time of the package or obtain current time, and automatically trigger the package disabling command when determining that the package is invalid based on the usage time or the current time. In another embodiment, the mobile terminal may display a package management interface via the APP for the virtual SIM, detect a disabling operation directed on the package management interface via the App for the virtual SIM, determine the invalid package according to the detected disabling operation, generate the package disabling command for the package and send the package disabling command to the server.

Block 322, the mobile terminal sends a package disabling command to the server via the APP for the virtual SIM.

The APP for the virtual SIM may send the package disabling command to the server after detecting that the package is invalid. The notification is configured to indicate the server to perform confirmation of whether the package is invalid. The notification may carry the package identification.

Block 323, the server receives the package disabling command and disables the package.

The server may detect whether the package is invalid according to the received package disabling command. If yes, the server may disable the package and stop providing the service for network communication using the package.

Block 324, the server feeds confirmation information that the package is invalid back to the mobile terminal.

Block 325, the mobile terminal receives the confirmation information via the APP for the virtual SIM, and sends a disabling processing command to the operating system for the virtual SIM.

The mobile terminal generates the disabling processing command after receiving the conformation information and sends the processing command to the operation system for the virtual SIM. The processing command carries the package identification.

Block 326, the operating system for the virtual SIM of the mobile terminal performs the disabling processing for the package.

The operating system for the virtual SIM may further forward the disabling processing command to the Modem to indicate the Modem to delete the package data or stop using the package data to perform the communication, or further to recover normal communication of the involved real SIM in the mobile terminal.

Figure 4:
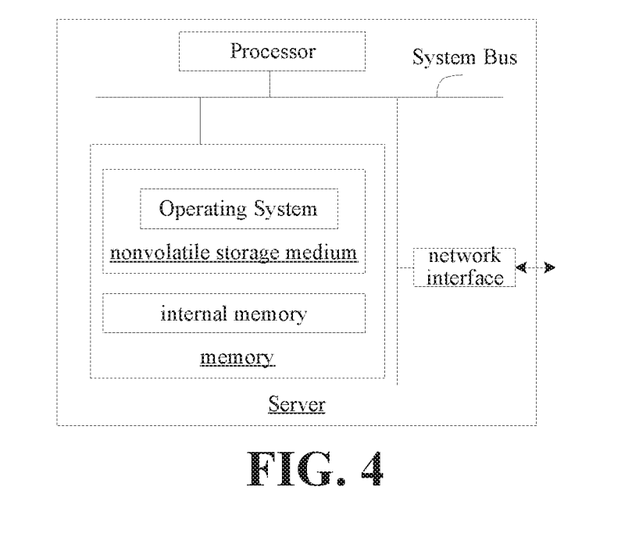
FIG. 4 is a schematic diagram of an internal structure of a server according to an embodiment of the present disclosure.

FIG. 4 is a schematic diagram of an internal structure of a server according to an embodiment of the present disclosure. As illustrated in FIG. 4, the server includes a processor, a nonvolatile storage medium, an internal memory and a network interface connected through a system bus. The processor is configured to provide computation and control abilities, for supporting running of the whole computer device. The memory is configured to store data, programs and so on. The memory includes a magnetic disc, an optical disc, a Read-Only Memory (ROM) or other nonvolatile storage mediums, or includes a Random Access Memory (RAM) or the like. For example, in an embodiment, the memory includes the nonvolatile storage medium and the internal memory. The nonvolatile storage medium stores an operating system and relevant data for implementing the information process method which is adapt to the computer device provided by the embodiment of the present disclosure, for example, the nonvolatile storage medium may store interface data for communicating with the APP for the virtual SIM on the computer device, relevant information of the virtual SIM or the like. The internal memory may provide a running environment for providing high-speed cache for the operating system in the nonvolatile storage medium and the information process method adapt to the computer device. The network interface may be an ethernet card, a wireless network card or the like, configured to communicate with external computer devices. The server may be implemented by a separate server or a server cluster composed of several servers. It should be understood by those skilled in the art that the structure illustrated in FIG. 4 is merely a diagram showing the partial structures related to the present disclosure, which should not be construed to limit the server in which the present disclosure is applied. The server may include more or less components than those illustrated in the figure, or a combination of some components, or have different arrangements of components.

Figure 5:
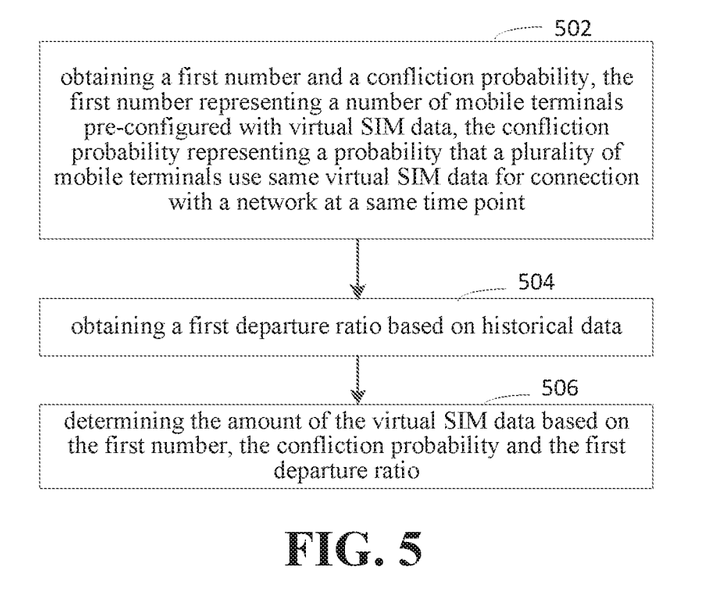
FIG. 5 is a flow chart of an information process method according to an embodiment of the present disclosure.

FIG. 5 is a flow chart of an information process method according to an embodiment of the present disclosure. As illustrated in FIG. 5, the information process method includes the followings.

A manufacturer of a mobile terminal needs to pre-configure virtual SIM data for the mobile terminal before delivery of the mobile terminal. When it is in a network unavailable status abroad, the mobile terminal may be connected to a network using the pre-configured virtual SIM data to provide network service for the user. The amount of the virtual SIM data to be pre-configured for the mobile terminal can be estimated based on a user departure ratio, a probability that the user uses the virtual SIM data and the number of mobile terminals.

The above virtual SIM data may be authentication information of a mobile communication network. The mobile terminal is connected to the mobile communication network according to the virtual SIM data, so as to connect to a data network, such that the mobile terminal may perform communication through the data network. When the above virtual SIM data is used for connection with the mobile communication network, a SIM card slot will be occupied. When the mobile terminal has an unoccupied SIM card slot, the unoccupied SIM card slot may be directly used. When the mobile terminal has no unoccupied SIM card slot, the mobile terminal may switch a state of a real SIM to a standby state and occupies the SIM card slot of the real SIM. In detail, the virtual SIM data may be an IMSI number, the IMSI number includes MCC (Mobile Country Code), MNC (Mobile Network Code) and MSIN (Mobile Subscriber Identification Number). The mobile terminal may be connected to the mobile communication network according to the IMSI number, so as to connect to the data network. In an embodiment, the virtual SIM data may be a number coded with a preset rule. An operator of a virtual network may identify the number. According to the above number, the mobile terminal sends a connecting request to the operator of the virtual network for connection with the mobile communication network, so as to connect to the data network. The preset rule may be a rule agreed by the mobile terminal and the operator of the virtual network.

Block 502, a first number and a confliction probability are obtained. The first number represents a number of mobile terminals pre-configured with virtual SIM data. The confliction probability represents a probability that a plurality of mobile terminals use same virtual SIM data for connection with a network at a same time point.

The mobile terminals of the same batch may be pre-configured with the same virtual SIM data. The first number may be the number of the mobile terminals pre-configured with the virtual SIM data, i.e., the production quantity of the mobile terminal of the same batch. When there is no available network abroad, the mobile terminal may select one virtual SIM data from many virtual SIM data for connection with the network. When a plurality of mobile terminals use the same virtual SIM data for connection with the network at the same time, it may cause a confliction situation that some mobile terminals may lose their connections.

Block 504, a first departure ratio is obtained based on historical data.

When the virtual SIM data is pre-configured, the first departure ratio is obtained. The first departure ratio represents an estimated user departure ratio, which may be obtained based on the historical data. The above historical data may be the user departure ratio at each time point within a preset time period, for example, the user departure ratio in every month during January, 2015 to June, 2017. The above historical data may also be an average value, a maximum value of the user departure ratios of within a preset time period. The above historical data may be a comparative growth on moving base of the user departure ratios, for example the comparative growth on moving base of the user departure ratio of in June of 2015, the user departure ratio of in June of 2016, and the user departure ratio of in June of 2017.

Block 506, the amount of the virtual SIM data is determined based on the first number, the confliction probability and the first departure ratio.

The first number, the confliction probability and the first departure ratio are inputted into an optimal solution model to obtain the amount of the virtual SIM data to be pre-configured. A departure number may be estimated based on the first number and the first departure ratio. For example, if the number of the mobile terminals of the same batch pre-configured with the virtual SIM data is 300,000 and the first user departure ratio is 3%, it means that there are 9,000 mobile terminals of the 300,000 mobile terminals going abroad. When the 9,000 mobile terminals connect to the network using the virtual SIM data, the probability that a confliction occurs is 10%, it means that the probability that several mobile terminals choose the same SIM data for connection with the network is less than 10%.

In the embodiment of the present disclosure, the amount of the virtual SIM data may be estimated based on the number of the mobile terminals that need to be pre-configured with the virtual SIM data, the ratio of users using the virtual SIM data and the user confliction probability, such that the manufacturer of mobile terminals may properly configure the virtual SIM data based on the estimated amount of the virtual SIM data.

In an embodiment, the information process method further includes the followings.

(1) First MCC information is obtained according to the historical data. The first MCC information includes the number of accesses corresponding to an MCC. The historical data may contain many MCCs corresponding to countries that the mobile terminal has ever been to. For each MCC, the first MCC information indicates the number that the mobile terminal accesses the country corresponding to the MCC.

(2) Second MCC information corresponding to the virtual SIM data is determined according to the first MCC information. The second MCC information indicates the MCC assigned for the virtual SIM data.

MCC is managed and assigned by International Telecommunication Union, configured to uniquely identify a number of a country in which a mobile terminal belongs. Different countries or districts have different MCCs. For example, the MCC for Chinese Mainland is 460. Generally, a real SIM in the mobile terminal may have the IMSI (International Mobile Subscriber Identification Number), which records effective information for distinguishing mobile users, including MCC or the like. For example, when a user buys the real SIM in Chinese Mainland, the MCC contained in the IMSI of the real SIM is 460.

After the amount of the virtual SIM data to be pre-configured is determined, the MCC information including the number of accesses corresponding to an MCC (i.e., the number of accesses corresponding to the country/district) may be obtained. If the mobile terminal accesses the country/district once, the number of accesses corresponding to the country/district is added by 1. Obtaining the MCC information based on the historical data includes obtaining the number of accesses corresponding to respective MCC within a preset time period. After the number of accesses corresponding to respective MCC is obtained, the amount of the virtual SIM data corresponding to the MCC may be determined according to a ratio of the numbers of accesses corresponding to MCCs. For example, the numbers of accesses corresponding to respective countries/districts during January, 2015 to June, 2017 are obtained, where the ratio of the numbers of accesses corresponding to America, Japan and France is 3:2:1. When the virtual SIM data is pre-configured for the mobile terminal, the ratio of the amount of the virtual SIM data corresponding to America, Japan and France is 3:2:1.

In the embodiment of the present disclosure, when access information corresponding to the country/district corresponds to the virtual SIM data corresponding to the country/district, the manufacturer of mobile terminals may configure the corresponding amount of the virtual SIM data based on the numbers of accesses corresponding to the country/district, such that the configuration of the amount of the virtual SIM data corresponding to respective country/district is proper, thus avoiding waste of the virtual SIM data.

In an embodiment, obtaining the first departure ratio based on the historical data may include the followings.

(1) Departure ratios corresponding to a plurality of time points within a preset time period are obtained.

(2) A scatter plot is drawn based on the plurality of time points and the departure ratios.

(3) A curve and a trend line are fitted on the scatter plot, and the first departure ratio is obtained according to the curve and the trend line.

Figure 6:
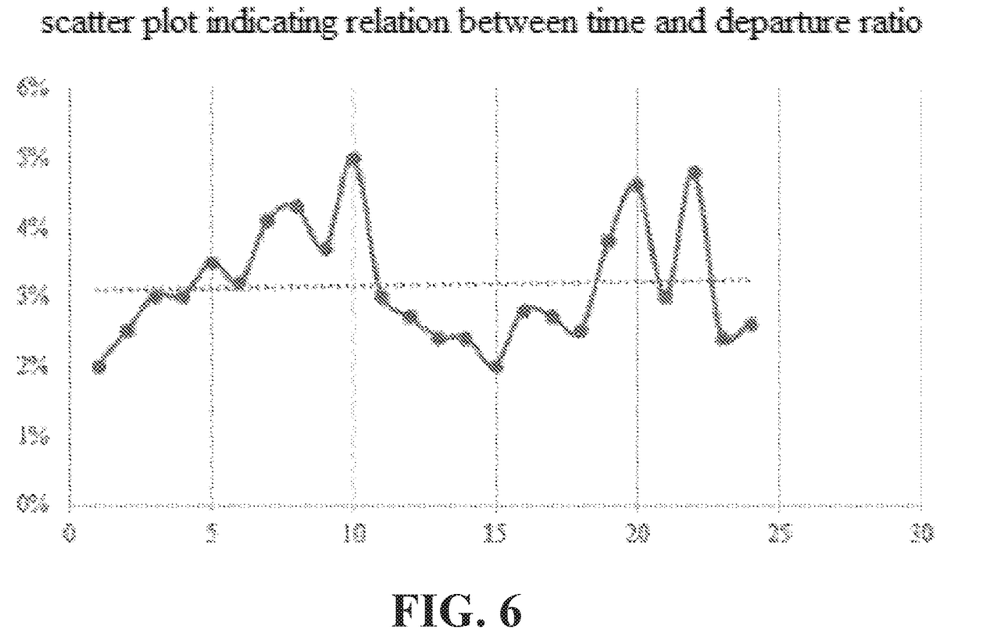
FIG. 6 is a scatter plot indicating a relation between a time and a departure ratio according to an embodiment of the present disclosure.

The first departure ratio is an estimated user departure ratio. The first departure ratio may be obtained based on the user departure ratio in the historical data. For example, the user departure ratio in each month during January, 2015 to December, 2016 is obtained, and the scatter plot indicating the relation between the time points and the user departure ratios is drawn in time order. As shown in the below table, the user departure ratios in 24 months from January, 2015 to December, 2016 are shown in time order.

TABLE 1

| User departure ratios from January, 2015 to December, 2016 | | | | | | | | | | | |
|---|---|---|---|---|---|---|---|---|---|---|---|
| 1 | 2 | 3 | 4 | 5 | 6 | 7 | 8 | 9 | 10 | 11 | 12 |
| 2% | 2.5% | 3.% | 3.0% | 3.5% | 3.2% | 4.1% | 4.3% | 3.7% | 5% | 3.0% | 2.7% |
| 13 | 14 | 15 | 16 | 17 | 18 | 19 | 20 | 21 | 22 | 23 | 24 |
| 2.4% | 2.4% | 2.0% | 2.8% | 2.7% | 2.5% | 3.8% | 4.6% | 3.0% | 4.8% | 2.4% | 2.6% |

The scatter plot drawn based on the above table is illustrated in FIG. 6. The curve and the trend line can be obtained by performing fitting on the scatter plot. After the curve and the trend line are obtained, a range of user departure ratios can be obtained according to the curve and an increment magnitude of the user departure ratios can be obtained according to a slope of the trend line. Taking the maximum user departure ratio or the average user departure ratio as a reference value, a user growth rate is determined based on the increment magnitude and a sum of the reference value and the user growth rate is configured as the first user departure ratio. The user growth rate may be set for the slope of the trend line. For example, when the slope of the trend line is 0~0.5, the user growth rate is set as 0.5%. When the slope of the trend line is 0.5~1, the user growth rate is set as 1%. When the slope of the trend line is negative, the corresponding user growth rate is negative, which means that the user ratio decreases. It can be seen from FIG. 6 that, during the 24 months from January, 2015 to December, 2016, the user departure ratio fluctuates from 2% to 5%. Taking the user departure ratio 5% as the reference value, since the user growth rate obtained from the trend line is 0.5%, the first departure ratio is 5.5%.

In the embodiment of the present disclosure, by performing data analysis and trend determination on the historical data, the estimated data is more accurate, such that the data accuracy is improved.

In an embodiment, obtaining the confliction probability includes: obtaining a usage time length of the virtual SIM data, obtaining a usage probability based on the historical data, and determining the confliction probability based on the usage time length and the usage probability.

The usage time length of the virtual SIM data indicates a preset time period during which the mobile terminal may connect to the network using the virtual SIM data. When the time period during which mobile terminal uses the virtual SIM data for connection with the network reaches the usage time length, the mobile terminal automatically disconnects from the network. The usage probability indicates a probability that departure users use the virtual SIM data for connection with the network. The high the usage probability, the long the usage time length, then the big the confliction probability. A positive correlation function of the usage probability, the usage time length and the confliction probability can be established. When the usage probability or the usage time length varies, the corresponding confliction probability can be obtained. For example, let the confliction probability be Z, the usage probability be X, the usage time length be Y, then Z=a*X+b*Y, where a and b are constants.

In the embodiment of the present disclosure, the confliction probability is determined based on the usage probability and the usage time length of the virtual SIM data, the confliction probability can be determined more accurately, thus the estimated amount of the virtual SIM data is more accurate, such that the data accuracy is improved.

In an embodiment, the information process method further includes the followings.

(1) A set of virtual SIM data is determined based on the amount of the virtual SIM data.

(2) The set of virtual SIM data is pre-configured for the mobile terminal.

(3) When detecting that the MCC changes and the mobile terminal is not connected to a network, the virtual SIM data is obtained from the set of virtual SIM data.

(4) The network is connected based on the virtual SIM data.

After the amount of the virtual SIM data is obtained, the corresponding amount of the virtual SIM data can be pre-configured for the mobile terminal.

When the mobile terminal detects the mobile communication network, information of the operator of the current mobile communication network can be detected. In detail, the mobile terminal may obtain the information of the operator of the current mobile communication network through CTTelephonyNetworkInfo and a type of CTCarrier in the CoreTelephony Framework. The type of CTCarrier may represent the information of operator of the current mobile communication network. The mobile terminal invokes subscriberCellularProvider in CTTelephonyNetworkInfo to obtain the type of CTCarrier. The type of CTCarrier records MCC and MNC of the current mobile communication network. MNC is configured to identify the number of the mobile communication network. The mobile terminal may invoke subscriberCellularProviderDidUpdateNotifier to detect whether the information of the operator of the current mobile communication network changes.

If the mobile terminal detects that the information of the operator of the current mobile communication network changes, the mobile terminal may further detect whether the MCC of the current mobile communication network changes. If the mobile terminal detects that the MCC of the current mobile communication network changes, the mobile terminal may obtain a current network status. In detail, the mobile terminal may directly obtain the current network status through Reachability, to determine whether the mobile terminal is connected to a network, the connected network is Wi-Fi (Wireless-Fidelity) network or cellular data network.

When the mobile terminal detects that the MCC changes the mobile terminal is not connected to a network, and the server can provide traffic resource corresponding to the current MCC, the virtual SIM data pre-configured for the mobile terminal can be obtained. The mobile terminal enables the virtual SIM data by occupying the card slot for the real SIM, to connect to the network for communication.

In the method according to the embodiment of the present disclosure, by pre-configuring the virtual SIM data for the mobile terminal, the mobile terminal may temporally connect to the network for communication using the virtual SIM data when the mobile terminal is in the network unavailable status abroad, thus bringing convenience for users and improving stickiness of users.

In an embodiment, the set of virtual SIM data includes a subset of virtual SIM data. Obtaining the virtual SIM data from the set of virtual SIM data includes the followings.

(1) The IMEI (International Mobile Equipment Identity) number of the mobile terminal is obtained.

(2) A first subset of virtual SIM data corresponding to the IMEI number is obtained.

(3) The virtual SIM data corresponding to the mobile terminal is selected from the first subset of virtual SIM data.

IMEI number is configured to uniquely identify the number of the mobile terminal. Different mobile terminals have different IMEI numbers. The single SIM mobile terminal has one IMEI number, while the dual SIM mobile terminal has two IMEI numbers. The IMEI number has one-to-one correspondence with the card slot in the mobile terminal. When the mobile terminal is a single SIM mobile terminal, the IMEI number of the mobile terminal may be obtained directly. When the mobile terminal is a dual SIM mobile terminal, the IMEI number corresponding to the SIM card slot occupied by the virtual SIM data can be obtained. When the mobile terminal is a dual SIM mobile terminal, the IMEI number can be obtained randomly.

IMEI number typically has 15 figures, with the first 6 figures representing a model, the $7^{th}$ and $8^{th}$ figures representing a place of production, the $9^{th}$-$14^{th}$ figures representing a production sequence number, and the $15^{th}$ figure representing a checking code. After obtaining the IMEI number, the mobile terminal may parses the IMEI number to determine the subset of virtual SIM data corresponding to the IMEI number. The mobile terminal may parse the IMEI number in at least one way of the following ways.

(1) A number formed of figures at predetermined positions of the IMEI number is obtained. For example, take the 13$^{th}$ and 14$^{th}$ figures of the IMEI number as the number.

(2) Computation is performed on the IMEI number according to a predetermined algorithm to obtain a number. For example, sum over the IMEI number and take the last 2 figures of the summed result as the number.

The subset of virtual SIM data corresponds to a subset number. After parsing the IMEI number to obtain the number, the mobile terminal may find the corresponding subset number. For example, the mobile terminal is pre-configured with 100 subsets of virtual SIM data, and each subset of virtual SIM data has 600 pieces of virtual SIM data. If the mobile terminal parses the IMEI number and obtains the number 23, then the mobile terminals find the subset with the subset number 23 as the subset of virtual SIM data corresponding to the IMEI number.

After obtaining the subset of virtual SIM data corresponding to the IMEI number, the mobile terminal may randomly select one pixel of virtual SIM data from the subset of virtual SIM data as the virtual SIM data corresponding to the IMEI number. In an embodiment, the mobile terminal may sort the virtual SIM data in the subset of virtual SIM data, for example, in an order of name. After obtaining the subset of virtual SIM data corresponding to the IMEI number, the mobile terminal may generate one random number and search for the corresponding virtual SIM data from the subset of virtual SIM data according to the random number. For example, if the mobile terminal obtains the random number 39, the mobile terminal finds the 39$^{th}$ piece of virtual SIM data in the subset of virtual SIM data.

In the embodiment of the present disclosure, after the mobile terminal obtains the subset of virtual SIM data, by randomly obtaining the virtual SIM data, the probability that different mobile terminals use the same virtual SIM data for connection with the network at the same time can be decreased, i.e., decreasing the confliction probability of different mobile terminals.

In an embodiment, the virtual SIM data is obtained from the set of virtual SIM data as follows.

(1) A second subset of virtual SIM data corresponding to the current MCC is obtained.

(2) The virtual SIM data corresponding to the mobile terminal is selected from the second subset of virtual SIM data.

The mobile terminal may pre-store the subset of virtual SIM data and the corresponding MCC. Each MCC may correspond to the same or different amount of the virtual SIM data in the subset of virtual SIM data. After obtaining the current MCC, the subset of virtual SIM data corresponding to the current MCC can be found. For example, the mobile terminal pre-stores the subset of virtual SIM data with the subset number 34 corresponding to the MCC which is 262. When the current MCC is 262, the subset of virtual SIM data with the subset number 34 may be found as the subset of virtual SIM data corresponding to the current MCC. After obtaining the subset of virtual SIM data corresponding to the current MCC, the mobile terminal may randomly select one virtual SIM data from the subset of virtual SIM data as the virtual SIM data corresponding to the current MCC. The mobile terminal may also sort the virtual SIM data in the subset of virtual SIM data, generate one random number after obtaining the subset of virtual SIM data corresponding to the current MCC, and find the corresponding virtual SIM data from the subset of virtual SIM data according to the random number.

In the method according to the embodiment of the present disclosure, after obtaining the current MCC, the subset of virtual SIM data is found according to the current MCC, and the virtual SIM data is obtained from the subset of virtual SIM data for connecting to the network, such that the probability that different mobile terminals use the same virtual SIM data for connection with the network at the same time may be decreased, thus decreasing the probability that the mobile terminal loses the connection, and improving the stickiness of users.

Figure 7:
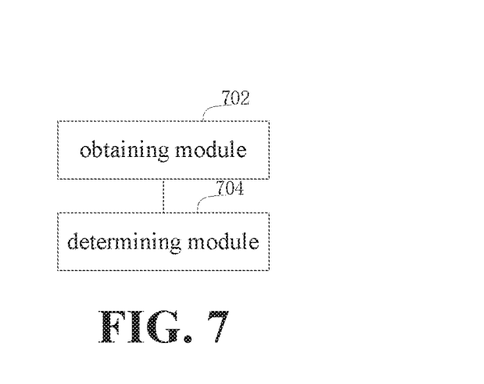
FIG. 7 is a block diagram of an information process device according to an embodiment of the present disclosure.

FIG. 7 is a block diagram of an information process device according to an embodiment of the present disclosure. As illustrated in FIG. 7, the information process device includes an obtaining module 702, and a determining module 704.

The obtaining module 702 is configured to obtain a first number and a confliction probability. The first number represents a number of mobile terminals pre-configured with virtual SIM data. The confliction probability represents a probability that a plurality of mobile terminals use same virtual SIM data at a same time point.

The obtaining module 702 is further configured to obtain a first departure ratio based on historical data.

The determining module 704 is configured to determine an amount of the virtual SIM data based on the first number, the confliction probability and the first departure ratio.

In an embodiment, the obtaining module 702 is further configured to obtain first mobile country code (MCC) information based on the historical data. The first MCC information includes a number of accesses corresponding to an MCC. The determining module 704 is further configured to determine second MCC information corresponding to the virtual SIM data based on the first MCC information.

In an embodiment, the obtaining module 702 obtains the first departure ratio based on the historical data by obtaining departure ratios corresponding to a plurality of time points within a preset time period; drawing a scatter plot based on the plurality of time points and the departure ratios; fitting the scatter plot to obtain a curve and a trend line; and obtaining the first departure ratio based on the curve and the trend line.

In an embodiment, the obtaining module 702 obtains the confliction probability by obtaining a usage time length of the virtual SIM data; obtaining a usage probability based on the historical data; and determining the confliction probability based on the usage time length and the usage probability.

Figure 8:
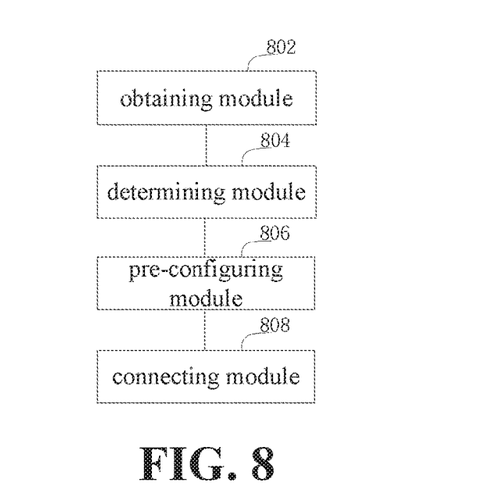
FIG. 8 is a block diagram of an information process device according to another embodiment of the present disclosure.

FIG. 8 is a block diagram of an information process device according to another embodiment of the present disclosure. As illustrated in FIG. 8, the information process device includes an obtaining module 802, a determining module 804, a pre-configuring module 806 and a connecting module 808. The obtaining module 802 and the determining module 804 have the same functions as the obtaining module 702 and the determining module 704 in FIG. 7, respectively.

The determining module 804 is further configured to determine a set of virtual SIM data based on the amount of the virtual SIM data.

The pre-configuring module 806 is configured to pre-configure the set of virtual SIM data for the mobile terminal.

The obtaining module 802 is further configured to obtain the virtual SIM data from the set of virtual SIM data when it is detected that the MCC changes and the mobile terminal is not connected to a network.

The connecting module 808 is configured to connect to the network based on the virtual SIM data.

In an embodiment, the set of virtual SIM data includes a subset of virtual SIM data. The obtaining module 802 obtains the virtual SIM data from the set of virtual SIM data by obtaining an international mobile equipment identity (IMEI) number of the mobile terminal; determining a first subset of virtual SIM data based on the IMEI number; and selecting the virtual SIM data corresponding to the mobile terminal from the first subset of virtual SIM data.

In an embodiment, the obtaining module 802 obtains the virtual SIM data from the set of virtual SIM data by obtaining a second subset of virtual SIM data corresponding to the current MCC; and selecting the virtual SIM data corresponding to the mobile terminal from the second subset of virtual SIM data.

The division of modules in the above information process device is only for illustration. In other embodiments, the information process device may be divided into different modules according to requirements, so as to complete all or part of functions of the information process device described above.

Embodiments of the present disclosure further provide a computer readable storage medium, one or more nonvolatile computer readable storage medium containing computer executable instructions. When the computer executable instructions are executed by one or more processors, the one or more processors are caused to implement following acts: (1) obtaining a first number and a confliction probability, the first number representing a number of mobile terminals pre-configured with virtual SIM data, the confliction probability representing a probability that a plurality of mobile terminals use same virtual SIM data for connection with a network at a same time point; (2) obtaining a first departure ratio based on historical data; and (3) determining an amount of the virtual SIM data based on the first number, the confliction probability and the first departure ratio.

In an embodiment, the one or more processors are further caused to implement: obtaining first mobile country code (MCC) information based on the historical data, the first MCC information including a number of accesses corresponding to an MCC; and determining second MCC information corresponding to the virtual SIM data based on the first MCC information.

In an embodiment, obtaining the first departure ratio based on the historical data includes: obtaining departure ratios corresponding to a plurality of time points within a preset time period; drawing a scatter plot based on the plurality of time points and the departure ratios; fitting the scatter plot to obtain a curve and a trend line; and obtaining the first departure ratio based on the curve and the trend line.

In an embodiment, obtaining the confliction probability includes: obtaining a usage time length of the virtual SIM data; obtaining a usage probability based on the historical data; and determining the confliction probability based on the usage time length and the usage probability.

In an embodiment, the one or more processors are further caused to implement: determining a set of virtual SIM data based on the amount of the virtual SIM data; pre-configuring the set of virtual SIM data in the mobile terminal; obtaining the virtual SIM data from the set of virtual SIM data when it is detected that the MCC changes and the mobile terminal is not connected to a network; and connecting to the network based on the virtual SIM data.

In an embodiment, the set of virtual SIM data includes a subset of virtual SIM data. Obtaining the virtual SIM data from the set of virtual SIM data includes: obtaining an international mobile equipment identity (IMEI) number of the mobile terminal; determining a first subset of virtual SIM data based on the IMEI number; and selecting the virtual SIM data corresponding to the mobile terminal from the first subset of virtual SIM data.

In an embodiment, obtaining the virtual SIM data from the set of virtual SIM data includes: obtaining a second subset of virtual SIM data corresponding to the current MCC; and selecting the virtual SIM data corresponding to the mobile terminal from the second subset of virtual SIM data.

Embodiments of the present disclosure further provide a computer program product including instructions. When the computer program product is running on a computer, the computer is caused to implement following acts: (1) obtaining a first number and a confliction probability, the first number representing a number of mobile terminals pre-configured with virtual SIM data, the confliction probability representing a probability that a plurality of mobile terminals use same virtual SIM data for connection with a network at a same time point; (2) obtaining a first departure ratio based on historical data; and (3) determining an amount of the virtual SIM data based on the first number, the confliction probability and the first departure ratio.

In an embodiment, the computer is further caused to implement: obtaining first mobile country code (MCC) information based on the historical data, the first MCC information including a number of accesses corresponding to an MCC; and determining second MCC information corresponding to the virtual SIM data based on the first MCC information.

In an embodiment, obtaining the first departure ratio based on the historical data includes: obtaining departure ratios corresponding to a plurality of time points within a preset time period; drawing a scatter plot based on the plurality of time points and the departure ratios; fitting the scatter plot to obtain a curve and a trend line; and obtaining the first departure ratio based on the curve and the trend line.

In an embodiment, obtaining the confliction probability includes: obtaining a usage time length of the virtual SIM data; obtaining a usage probability based on the historical data; and determining the confliction probability based on the usage time length and the usage probability.

In an embodiment, the computer is further caused to implement: determining a set of virtual SIM data based on the amount of the virtual SIM data; pre-configuring the set of virtual SIM data in the mobile terminal; obtaining the virtual SIM data from the set of virtual SIM data when it is detected that the MCC changes and the mobile terminal is not connected to a network; and connecting to the network based on the virtual SIM data.

In an embodiment, the set of virtual SIM data includes a subset of virtual SIM data. Obtaining the virtual SIM data from the set of virtual SIM data includes: obtaining an international mobile equipment identity (IMEI) number of the mobile terminal; determining a first subset of virtual SIM data based on the IMEI number; and selecting the virtual SIM data corresponding to the mobile terminal from the first subset of virtual SIM data.

In an embodiment, obtaining the virtual SIM data from the set of virtual SIM data includes: obtaining a second subset of virtual SIM data corresponding to the current MCC; and selecting the virtual SIM data corresponding to the mobile terminal from the second subset of virtual SIM data.

Figure 9:
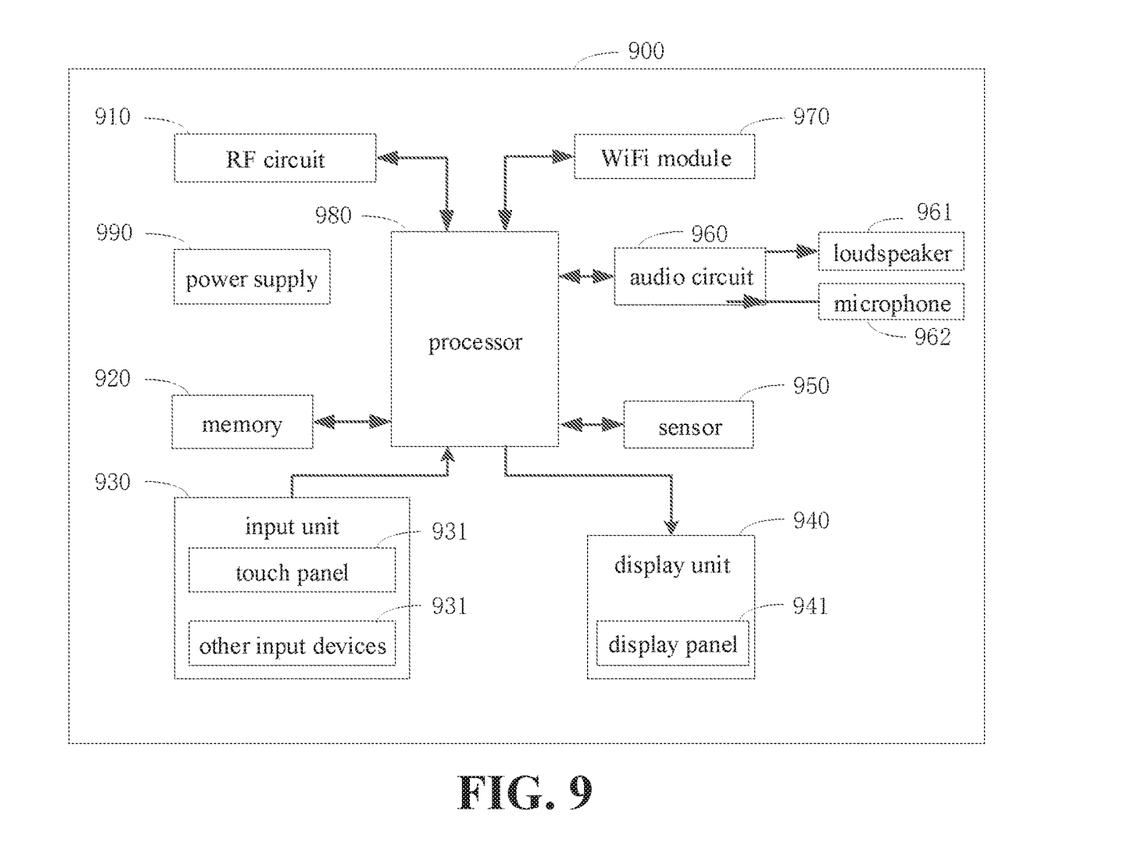
FIG. 9 is a block diagram of a partial structure of a mobile phone related to a computer device provided by an embodiment of the present disclosure.

Embodiments of the present disclosure further provide a mobile terminal. As illustrated in FIG. 9, for convenience of description, only parts related to the embodiments of the present disclosure are illustrated, and for specific technical details that are not disclosed, please refer to related descriptions of the method embodiments. The mobile terminal may be any terminal device including a mobile phone, a tablet computer, a personal digital assistant (PDA), a point of sales (POS), a vehicle-mounted computer, a wearable device, and the like. The mobile phone configured as the mobile terminal is taken as an example for illustration.

FIG. 9 is a block diagram of a structure of a mobile phone 900 related to a mobile terminal according to an embodiment of the present disclosure. Referring to FIG. 9, the mobile phone 900 may include a radio frequency (RF) circuit 910, a memory 920, an input unit 930, a display unit 940, a sensor 950, an audio circuit 960, a wireless fidelity (WiFi) module 970, a processor 980, a power supply 990 and the like. It will be understood by those skilled in the art that, the structure of the mobile phone 900 illustrated in FIG. 9 does not constitute a limitation on the mobile phone 900. The mobile phone may include less or more components than those illustrated in FIG. 9 or combinations thereof, or have a different arrangement of components.

The RF circuit 910 may be configured to receive and transmit signals during a process of transmitting and receiving a message or making a call. The RF circuit 910 may be configured to receive downlink data from a base station and to transmit the downlink data to the processor 980. Alternatively, the RF circuit 910 may be configured to transmit uplink data to the base station. In general, the RF circuit includes but is not limited to an antenna, at least one amplifier, a transceiver, a coupler, a low noise amplifier (LNA), a diplexer and the like. Furthermore, the RF circuit 910 may be further configured to communicate with other devices via wireless communication and network. The above wireless communication may adopt any communication standard or protocol, which includes but is not limited to global system of mobile communication (GSM), general packet radio service (GPRS), code division multiple access (CDMA), wideband code division multiple access (WCDMA), long term evolution (LTE), e-mail, short messaging service (SMS) and the like.

The memory 920 may be configured to store software programs or modules. The processor 980 is configured to execute various functional applications and data processes of the mobile terminal by running the software programs and modules stored in the memory 920. The memory 920 may mainly include a program storage region and a data storage region. The program storage region may store an operating system, at least one function required application (such as an application having a sound playing function, an application having an image playing function) and the like. The data storage region may store data produced by using the mobile phone 900 (such as audio data, an address book) and the like. In addition, the memory 920 may include a high speed random access memory and may include a non-volatility memory, such as at least one disk memory, a flash memory, or other volatility solid state memory.

The input unit 930 may be configured to receive figure or character information inputted and generate a key signal input related to a user setup or function control of the mobile phone 900. In detail, the input unit 930 may include a touch panel 931 and other input devices 932. The touch panel 931 (also called as touch screen) may be configured to gather touch operations near or on the touch panel 931 (such as an operation on the touch panel 931 or near the touch panel 931 of the user with a finger, a stylus or other suitable objects or attachments), and drive corresponding coupled device according to a preset program. In an embodiment, the touch panel 931 may include a touch detection device and a touch controller. The touch detection device detects an orientation of the user's touch, detects a signal caused by the touch operation and sends the signal to the touch controller. The touch controller receives the touch information from the touch detection device, converts the touch information to touch point coordinates, and sends the touch point coordinates to the processor 980. Furthermore, the touch controller may receive and execute a command sent from the processor 980. The touch panel 931 may be implemented as a resistive type, a capacitive type, an infrared type and a surface acoustic wave type touch panel. In addition to the touch panel 931, the input unit 930 may further include other input devices 932. In detail, the other input devices 932 may include but are not limited to one or more of a physical keyboard, a functional key (such as a volume control key, a switch key and the like).

The display unit 940 may be configured to display information inputted by the user or information provided to the user or various menus of the mobile phone 900. The display unit 940 may include a display panel 941. In an embodiment, the display panel 941 may be configured as a liquid crystal display (LCD), an organic light-emitting diode (OLED) and the like. In an embodiment, the touch panel 931 may cover the display panel 941. When the touch panel 931 detects the touch operation on the touch panel 931 or near the touch panel 931, the touch operation is transmitted to the processor 980 to determine a type of the touch event. Thereafter, the processor 980 provides a corresponding visual output on the display panel 941 according to the type of the touch event. Although the touch panel 931 and the display panel 941 are two separate components in FIG. 9 to realize an input and output function of the mobile terminal, in certain embodiments, the touch panel 931 and the display panel 941 may be integrated to realize the input and output function of the mobile terminal.

The mobile phone 900 may further include at least one sensor 950, such as an optical sensor, a motion sensor and other sensors. In detail, the optical sensor may include a surrounding light sensor and a proximity sensor. The surrounding light sensor may adjust a brightness of the display panel 941 according to surrounding lights. The proximity sensor may close the display panel 941 and/or backlight when the mobile phone 900 moves near ears of the user. The motion sensor may include an acceleration sensor. By the acceleration sensor the acceleration values in various directions can be measured, and a magnitude and a direction of gravity can be measured when the mobile phone 900 is static. The acceleration sensor can be used in identifying a posture of the mobile phone 900 (such as landscape/portrait screen switching), vibration recognition related functions (such as a pedometer, a knocking) and the like. Furthermore, the mobile phone 900 may be configured with a gyroscope, a barometer, a hygrometer, a thermometer, an infrared sensor and other sensors.

The audio circuit 960, a loudspeaker 961 and a microphone 962 may provide an audio interface between the user and the mobile phone 900. The audio circuit 960 may receive audio data, convert the audio data to an electrical signal, and transmit the electrical signal to the loudspeaker 961. The loudspeaker 961 converts the electrical signal to a sound signal and output the sound signal. In another aspect, the microphone 962 may convert gathered sound signals to electrical signals. The audio circuit 960 receives and converts the electrical signals to audio data and outputs the audio data to the processor 980 for processing. The audio data processed by the processor 980 may be transmitted to another mobile terminal via the RF circuit 910 or may be stored in the memory 920 for further processing.

Wi-Fi is a short distance wireless communication technology. The mobile phone 900 may help the user to receive or send an e-mail, browse webpages, access to stream medium via the Wi-Fi module 970. The Wi-Fi module 970 provides wireless broadband Internet access service to the user. Although the Wi-Fi module 970 is illustrated in FIG. 9, it may be understood that, the Wi-Fi module 970 is not essential for the mobile phone 900, thus it may be omitted according to demands.

The processor 980 is a control center of the mobile phone 900, which utilizes various interfaces and wires to couple various parts of the mobile phone 900. By running or executing the software program and/or modules stored in the memory 920, and by invoking data stored in the memory 920, the various functions and data processing functions may be executed, thus integrally monitoring the mobile phone 900. In an embodiment, the processor 980 may include one or more processing units. In an embodiment, the processor 980 may be integrated with an application processor and a modem processor. The application processor mainly processes the operating system, a user interface and an application. The modem processor mainly processes wireless communication. It may be understood that, the above modem processor may be not integrated in the processor 980.

The mobile phone 900 may further include a power supply 990 (such as a battery) for providing power to various components of the mobile phone 900. Preferably, the power supply may be logically coupled to the processor 980 via a power management system, thereby managing charging, discharging and power consumption via the power management system.

In an embodiment, the mobile phone 900 may further include a camera, a Bluetooth module or the like.

In embodiments of the present disclosure, when the processor 980 included in the mobile phone 900 executes the computer programs stored in the memory 920, the processor 980 performs following acts: (1) obtaining a first number and a confliction probability, the first number representing a number of mobile terminals pre-configured with virtual SIM data, the confliction probability representing a probability that a plurality of mobile terminals use same virtual SIM data for connection with a network at a same time point; (2) obtaining a first departure ratio based on historical data; and (3) determining an amount of the virtual SIM data based on the first number, the confliction probability and the first departure ratio.

In an embodiment, the processor further performs: obtaining first mobile country code (MCC) information based on the historical data, the first MCC information including a number of accesses corresponding to an MCC; and determining second MCC information corresponding to the virtual SIM data based on the first MCC information.

In an embodiment, obtaining the first departure ratio based on the historical data includes: obtaining departure ratios corresponding to a plurality of time points within a preset time period; drawing a scatter plot based on the plurality of time points and the departure ratios; fitting the scatter plot to obtain a curve and a trend line; and obtaining the first departure ratio based on the curve and the trend line.

In an embodiment, obtaining the confliction probability includes: obtaining a usage time length of the virtual SIM data; obtaining a usage probability based on the historical data; and determining the confliction probability based on the usage time length and the usage probability.

In an embodiment, when the computer device is a mobile terminal, the processor further performs: (1) determining a set of virtual SIM data based on the amount of the virtual SIM data; (2) pre-configuring the set of virtual SIM data in the mobile terminal; (3) obtaining the virtual SIM data from the set of virtual SIM data when it is detected that the MCC changes and the mobile terminal is not connected to a network; and (4) connecting to the network based on the virtual SIM data.

In an embodiment, the set of virtual SIM data includes a subset of virtual SIM data. Obtaining the virtual SIM data from the set of virtual SIM data includes: obtaining an international mobile equipment identity (IMEI) number of the mobile terminal; determining a first subset of virtual SIM data based on the IMEI number; and selecting the virtual SIM data corresponding to the mobile terminal from the first subset of virtual SIM data.

In an embodiment, obtaining the virtual SIM data from the set of virtual SIM data includes: obtaining a second subset of virtual SIM data corresponding to the current MCC; and selecting the virtual SIM data corresponding to the mobile terminal from the second subset of virtual SIM data.

References to the storage, memory, database or other medium used herein may include nonvolatile and/or volatile storage medium. The nonvolatile storage medium may include a read-only memory (ROM), a programmable ROM (PROM), an electrically programmable ROM (EPROM), an electrically erasable programmable ROM (EEPROM), or flash memory. The volatile storage medium may include a random access memory (RAM) which is used as an external high speed cache. As an explanation, not a limitation, the RAM can be implemented in many forms, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Rambus direct RAM (RDRAM), a direct Rambus dynamic RAM (DRDRAM) and a Rambus dynamic RAM (RDRAM).

The above embodiments illustrate merely some implementations of the present disclosure, which are described in details but are not construed to limit the scope of the present disclosure. It should be pointed that, for those skilled in the art, without departing from the principle of the present disclosure, various changes and improvements may be made, which are covered by the protection scope of the present disclosure. Therefore, the protection scope of the present disclosure is according to the appended claims.

What is claimed is:

1. A method for information processing, comprising:
   obtaining a first number and a confliction probability, the first number representing a number of mobile terminals pre-configured with virtual SIM data, the confliction probability representing a probability that a plurality of mobile terminals use same virtual SIM data for connection with a network at a same time point;
   obtaining a first departure ratio based on historical data; and
   determining an amount of the virtual SIM data based on the first number, the confliction probability and the first departure ratio.

2. The method of claim 1, further comprising:
   obtaining mobile country code (MCC) information based on the historical data, the MCC information comprising a number of accesses corresponding to each MCC contained in the historical data; and determining an MCC corresponding to the virtual SIM data based on the MCC information.

3. The method of claim 2, wherein obtaining the MCC information based on the historical data comprises:
obtaining the numbers of accesses corresponding respectively to the MCCs contained in the historical data;
determining a ratio of the numbers of accesses corresponding respectively to the MCCs; and
determining an amount of the virtual SIM data corresponding respectively to the MCCs based on the ratio.

4. The method of claim 1, wherein obtaining the first departure ratio based on the historical data comprises:
obtaining departure ratios corresponding respectively to a plurality of time points within a preset time period;
drawing a scatter plot based on the departure ratios and the plurality of time points; and
fitting the scatter plot to obtain a trend line and obtaining the first departure ratio based on the departure ratios and the trend line.

5. The method of claim 4, wherein obtaining the first departure ratio based on the departure ratios and the trend line comprises:
obtaining an increment magnitude of the departure ratios based on a slope of the trend line;
taking a maximum value or an average value of the departure ratios as a reference value;
determining a user growth rate based on the increment magnitude; and
summing up the reference value and the user growth rate to obtain the first departure ratio.

6. The method of claim 1, wherein obtaining the confliction probability comprises:
obtaining a usage time length of the virtual SIM data;
obtaining a usage probability based on the historical data; and
determining the confliction probability based on the usage time length and the usage probability.

7. The method of claim 6, wherein determining the confliction probability based on the usage time length and the usage probability comprises:
establishing a positive correlation function of the usage probability, the usage time length and the confliction probability; and
determining the confliction probability based on the positive correlation function.

8. The method of claim 1, further comprising:
determining a set of virtual SIM data based on the amount of the virtual SIM data;
pre-configuring the set of virtual SIM data in the mobile terminal;
in response to detecting that an MCC of the mobile terminal changes and the mobile terminal is not connected to the network, obtaining the virtual SIM data from the set of virtual SIM data; and
connecting to the network based on the virtual SIM data.

9. The method of claim 8, wherein the set of virtual SIM data comprises a subset of virtual SIM data, and obtaining the virtual SIM data from the set of virtual SIM data comprises:
obtaining an international mobile equipment identity (IMEI) number of the mobile terminal;
obtaining a first subset of virtual SIM data corresponding to the IMEI number; and
selecting the virtual SIM data corresponding to the mobile terminal from the first subset of virtual SIM data.

10. The method of claim 9, wherein selecting the virtual SIM data corresponding to the mobile terminal from the first subset of virtual SIM data comprises:
sorting the virtual SIM data in the first subset of virtual SIM data;
generating a random number; and
searching for the virtual SIM data corresponding to the random number from the first subset of virtual SIM data.

11. The method of claim 9, wherein obtaining the first subset of virtual SIM data corresponding to the IMEI number comprises:
parsing the IMEI number to obtain a second number; and
obtaining the first subset of virtual SIM data corresponding to the second number.

12. The method of claim 11, wherein parsing the IMEI number to obtain the second number comprises:
obtaining figures at present digits of the IMEI number; and
determining the second number formed of the figures.

13. The method of claim 11, wherein parsing the IMEI number to obtain the second number comprises:
performing a calculation on the IMEI number based on a preset algorithm to obtain the second number.

14. The method of claim 8, wherein the set of virtual SIM data comprises a subset of virtual SIM data, and obtaining the virtual SIM data from the set of virtual SIM data comprises:
obtaining a second subset of virtual SIM data corresponding to the MCC of the mobile terminal; and
selecting the virtual SIM data corresponding to the mobile terminal from the second subset of virtual SIM data.

15. A non-transitory computer readable storage medium, storing computer programs therein, wherein when the computer programs are executed by a processor, the processor is caused to implement operations of an information process method comprising:
obtaining a first number and a confliction probability, the first number representing a number of mobile terminals pre-configured with virtual SIM data, the confliction probability representing a probability that a plurality of mobile terminals use same virtual SIM data for connection with a network at a same time point;
obtaining a first departure ratio based on historical data; and
determining an amount of the virtual SIM data based on the first number, the confliction probability and the first departure ratio.

16. A computer device, comprising: a memory and a processor, wherein the memory has computer readable instructions stored therein, when the computer readable instructions are executed by the processor, the processor is caused to implement following operations:
obtaining a first number and a confliction probability, the first number representing a number of mobile terminals pre-configured with virtual SIM data, the confliction probability representing a probability that a plurality of mobile terminals use same virtual SIM data for connection with a network at a same time point;
obtaining a first departure ratio based on historical data; and
determining an amount of the virtual SIM data based on the first number, the confliction probability and the first departure ratio.

17. The computer device of claim 16, wherein when the computer readable instructions are executed by the processor, the processor is further caused to implement following operations:

obtaining mobile country code (MCC) information based on the historical data, the MCC information comprising a number of accesses corresponding to each MCC contained in the historical data; and determining an MCC corresponding to the virtual SIM data based on the MCC information.

18. The computer device of claim 16, wherein when the computer readable instructions are executed by the processor to obtain the first departure ratio based on the historical data, the processor is caused to implement following operations:

obtaining departure ratios corresponding respectively to a plurality of time points within a preset time period;

drawing a scatter plot based on the departure ratios and the plurality of time points; and fitting the scatter plot to obtain a trend line and obtaining the first departure ratio based on the departure ratios and the trend line.

19. The computer device of claim 16, wherein when the computer readable instructions are executed by the processor to obtain the confliction probability, the processor is caused to implement following operations:

obtaining a usage time length of the virtual SIM data;

obtaining a usage probability based on the historical data; and determining the confliction probability based on the usage time length and the usage probability.

20. The computer device of claim 16, wherein when the computer readable instructions are executed by the processor, the processor is further caused to implement following operations:

determining a set of virtual SIM data based on the amount of the virtual SIM data;

pre-configuring the set of virtual SIM data in the mobile terminal;

in response to detecting that an MCC of the mobile terminal changes and the mobile terminal is not connected to the network, obtaining the virtual SIM data from the set of virtual SIM data; and connecting to the network based on the virtual SIM data.

* * * * *